DIVERSITY RECEIVER SYSTEM WITH SEQUENTIAL COMPARISON AND CONTROL OF SIGNAL SEGMENTS IN AMPLITUDE AND PHASE

Filed June 9, 1964 5 Sheets-Sheet 1

INVENTOR
LEONARD R. KAHN
BY Mattison & Graybeal
ATTORNEYS

INVENTOR.
LEONARD R. KAHN
BY Mathis & Graybeal
ATTORNEYS

Jan. 16, 1968 L. R. KAHN 3,364,428

DIVERSITY RECEIVER SYSTEM WITH SEQUENTIAL COMPARISON AND CONTROL OF SIGNAL SEGMENTS IN AMPLITUDE AND PHASE

Filed June 9, 1964 5 Sheets-Sheet 3

INVENTOR.
LEONARD R. KAHN
BY Mathews & Graybeal
ATTORNEYS

INVENTOR.
LEONARD R. KAHN
BY Mathis & Graybeal
ATTORNEYS

| * PHASE SHIFT STAGE | $C_X$ VALUE | $R_X$ VALUE |
|---|---|---|
| 0° | .068µf | 1.0MΩ |
| 30° | .022 | 1.1 |
| 60° | .01 | 1.2 |
| 90° | .006 | 1.3 |
| 120° | 3300µµf | 1.4 |
| 150° | 1600 | 1.5 |
| 180° | NONE | 1.6 |
| 210° | .04µf | 1.7 |
| 240° | .01 | 1.8 |
| 270° | .006 | 1.9 |
| 300° | 3300µµf | 2.0 |
| 330° | 600 | 2.1 |

INVENTOR
LEONARD R. KAHN
BY Mathis & Graybeal
ATTORNEYS

United States Patent Office 3,364,428

Patented Jan. 16, 1968

3,364,428

DIVERSITY RECEIVER SYSTEM WITH SEQUENTIAL COMPARISON AND CONTROL OF SIGNAL SEGMENTS IN AMPLITUDE AND PHASE

Leonard R. Kahn, 81 S. Bergen Place, Freeport, N.Y. 11520

Filed June 9, 1964, Ser. No. 373,787
22 Claims. (Cl. 325—305)

The present invention relates to diversity receiver systems of the type wherein a plurality of diversely received and separately channeled signals are combined to give a combined signal incorporating the audio intelligence of both signals, and more particularly relates to such a system wherein the respective diversity signals are segmented and segments thereof of like frequency are compared and controlled in relative gain and relative phase so that the signals when combined have an optimized signal-to-noise ratio.

As an important characteristic of the system and operating technique of the invention, a single "brain" is utilized to effect sequential comparison of respective signal segments of like frequency, both in amplitude and phase, to develop respective gain control voltages for the respective segments, and a phase control voltage to correct the phase of the signal segment with reference to the phase of the corresponding signal segment, and to sequentially deliver to separate channel segmentors for the respective signals the appropriate segment gain control voltages and segment phase control voltages, such "brain" in effect providing optimized amplitude and phase control between each of a pair of sub-band signal pairs of like frequency in the separate signal channels of the diversity signals.

In addition to the overall system concept presented by the invention, a further feature thereof resides in a novel automatic phase control circuit, otherwise termable a phase comparison and correction circuit, wherein relative differences in phase of up to about ±180° are detected and a correction voltage output of like polarity is generated which is proportional to the detected phase difference. Such an almost "full cycle" or almost "360°" phase detector circuit is to be contrasted with conventional phase detector circuits which have a capability of detecting phase differences of only up to about ±90° without reversal in output slope polarity.

Yet another aspect of the present invention is found in an automatic resetting circuit, also termable an "auto-set" circuit, functioning in conjunction with an automatic correction circuit having a variable control voltage output, to sense signal level in the correction circuit and pass the control voltage output only when said signal level is in excess of a predetermined level, the "auto-set" circuit also functioning to disable the automatic control voltage if the value thereof exceeds or is less than predetermined range of values, generating in such event alternatively applied reset control voltage outputs which are voltages within the operating range of the automatic control voltage, and further functioning to automatically repass the automatic control voltage generated by the correction circuit when the controlled circuit is reset.

The fundamental idea underlying the present invention is that of segmenting the audio intelligence passbands of two or more diversity channels, then comparing each of the segments of one channel with the segment of corresponding frequency of the other channel, and doing so with a single condition sensing and operation controlling "brain." Fading rates among plural diversity channels are generally substantially longer than one-tenth of a second, and it has been found unnecessary to continuously monitor all spectral components of the diversity channels. Rather, each channel or segment thereof need be monitored only often enough so that the varying fading conditions can be followed adequately. By use of a single sensing and control unit, in which a sequential switching device such as a commutator cyclically and sequentially scans and controls various channel segments, an improved combining is effected with appreciable savings in equipment cost and complexity. Without sequential scanning, each diversity channel pair would have to have its own amplitude and phase comparison and control circuits. When relatively small channel segments or sub-bands are employed, such as in the example here presented where the audio intelligence passband is 3000 cycles in width and is segmented into 100 cycle sub-bands (i.e. is comprised of thirty sub-bands or segments), the magnitude of necessary equipment to continuously monitor all channel segments is manifest.

Incident to the sequential comparison and control of channel segments at a repetition frequency of about ten times per second, it is a further feature of the present invention that the channel segmenting portions of the system operate at intermediate frequency, i.e. the signal segments span an intermediate frequency passband (of from 10.250 kcs. to 13.250 kcs. in the example selected), in order that there be an adequate number of cycles in each signal sample at the segment scanning rate indicated (about .003 second per segment).

These and other objects, features, advantages and characteristics of the present invention will be apparent from the following discussion and accompanying illustrations pertaining to a typical and therefore non-limitive embodiment thereof, wherein like legends, letters and numerals refer to like parts, and wherein.

Figures 1, 3:
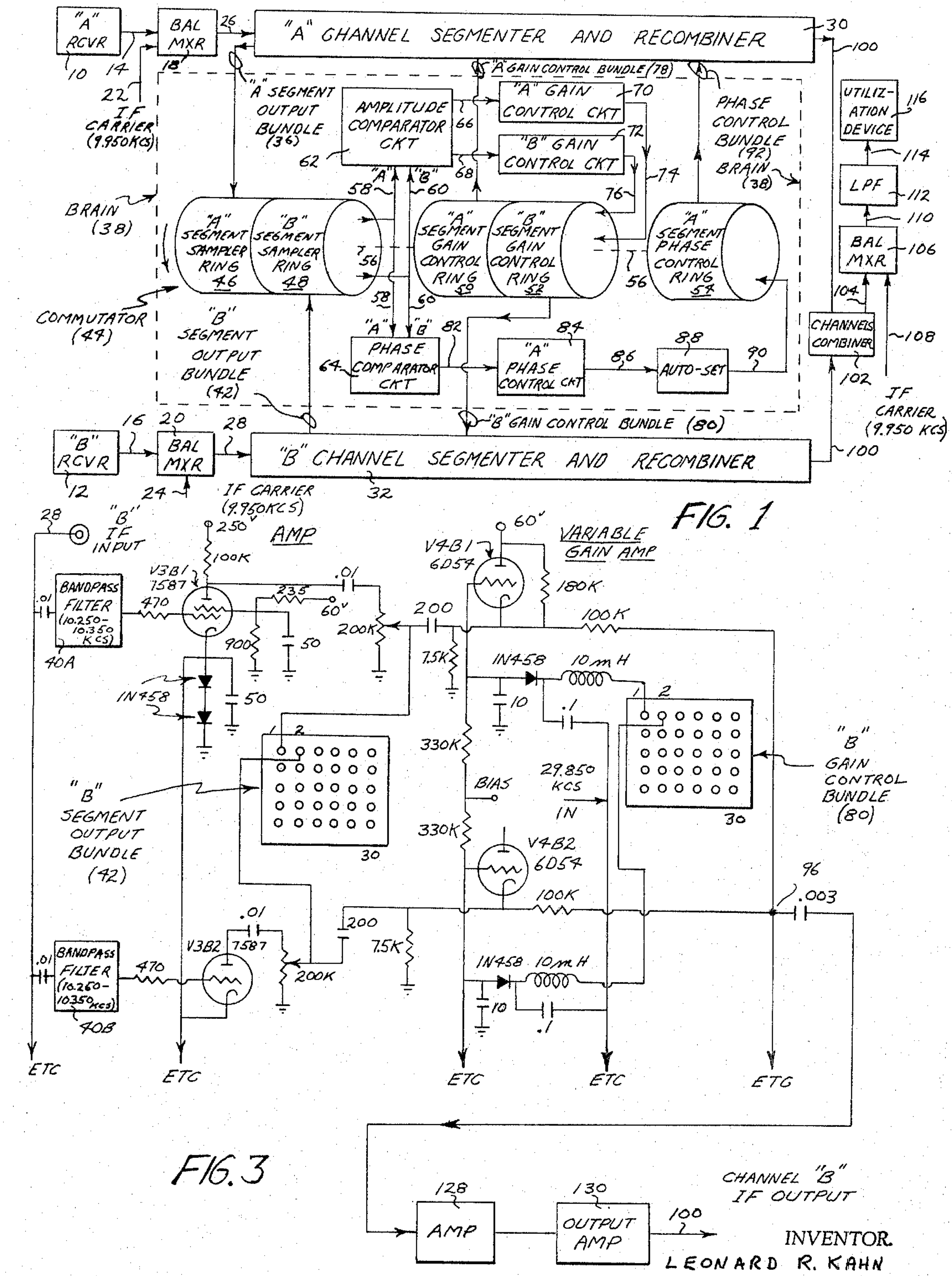
FIG. 1 is a general block diagram of a two channel diversity system embodying the invention.
FIG. 3 is a somewhat simplified schematic diagram, similar to the showing of FIG. 2, fragmentarily illustrating the B channel segmentor and recombiner section of the system shown in FIG. 1.
Figure 5:
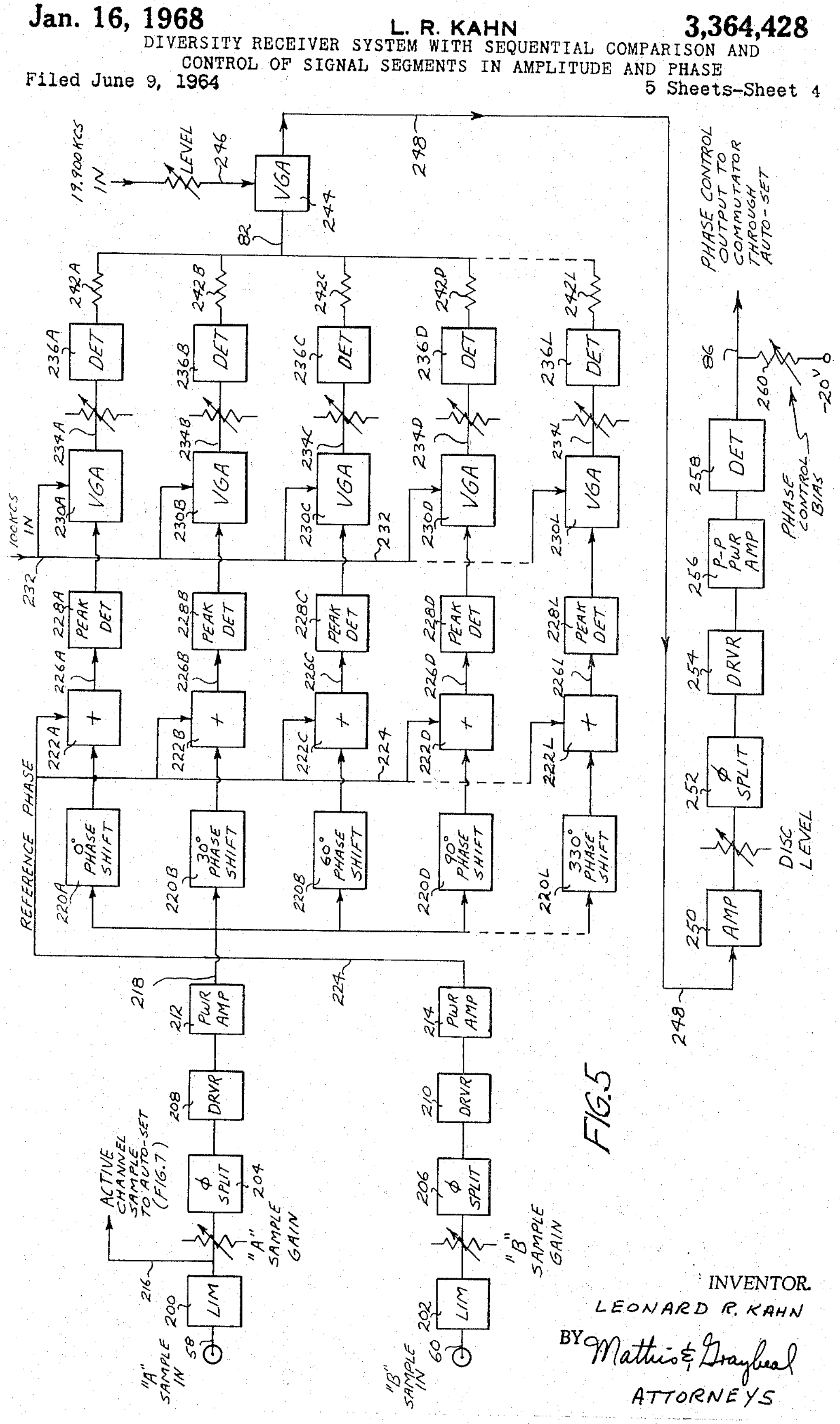
FIG. 5 is a block diagram of the phase comparator circuit and the A phase control circuit portion of the brain section of the system shown in FIG. 1.
Figure 6:
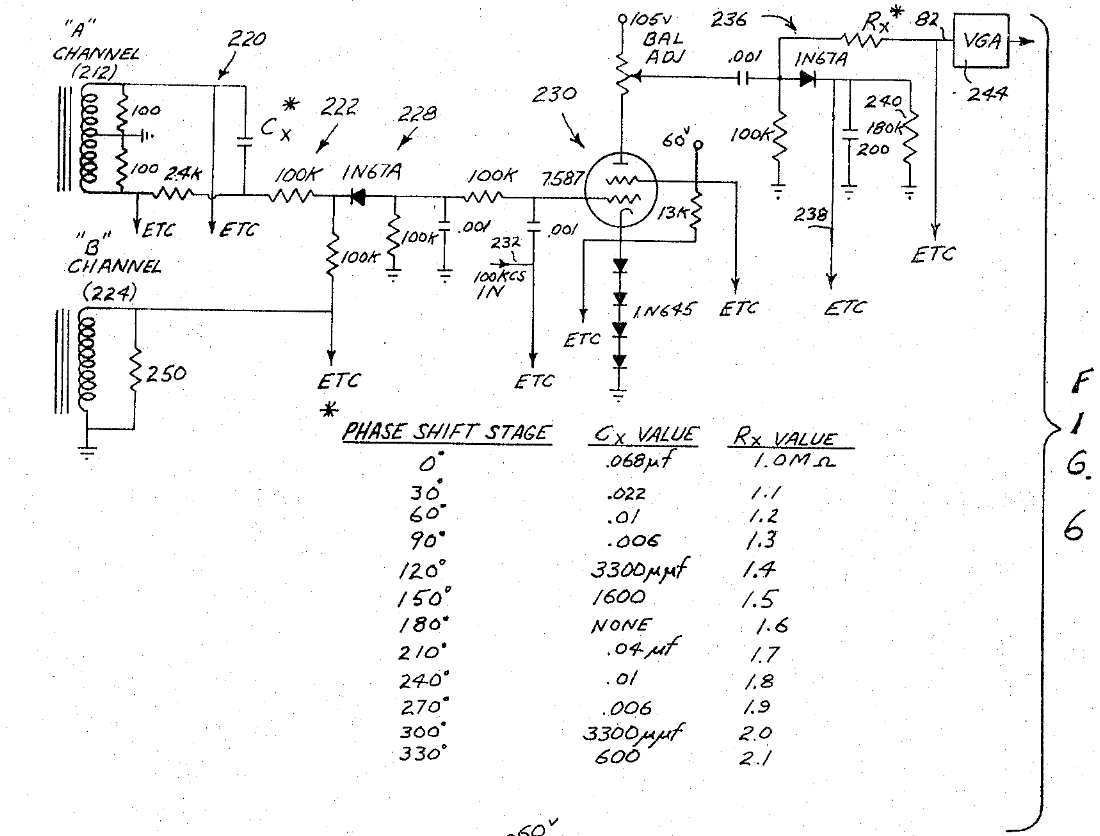
Figure 7:
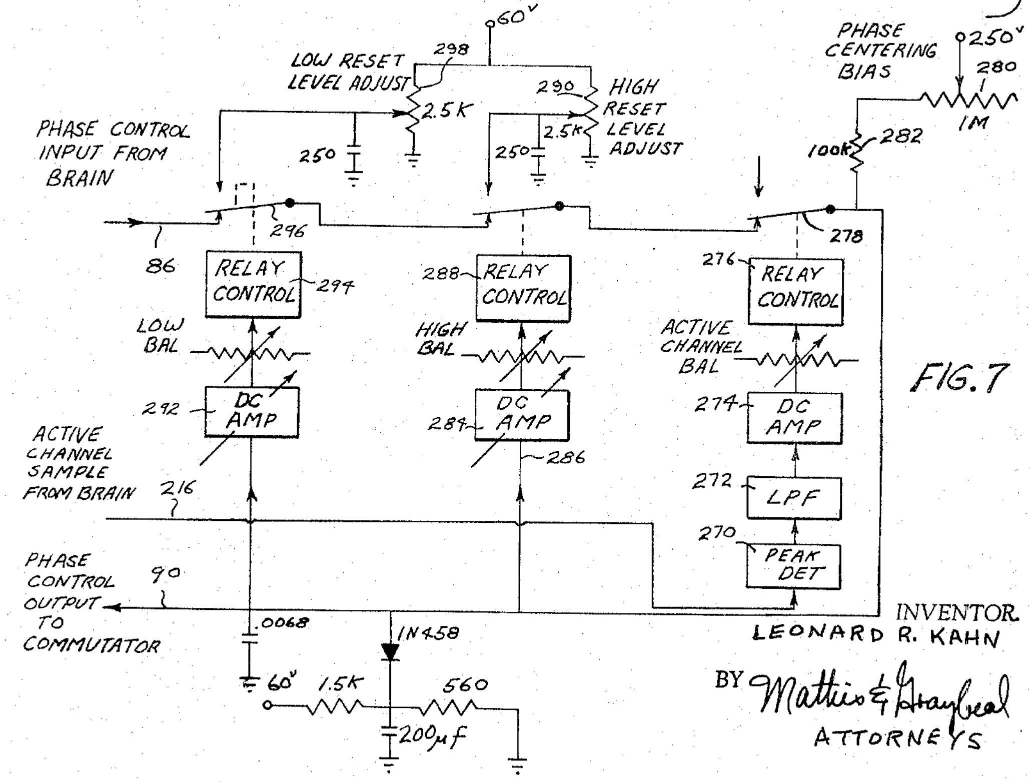

FIG. 6 is a somewhat simplified schematic showing of one (the 0°) phase shift circuit and the phase control voltage deriving detector circuit portions of the circuits shown in FIG. 5, together with a tabular showing of various $C_x$ and $R_x$ values by which the various phase shift and phase detection stages of these circuits are realized; and FIG. 7 is a diagram, partially in block form and partially in schematic form, showing the "auto-set" portion of the brain section of the FIG. 1 system.

FIG. 1 illustrates the general layout of system components in a typical diversity system according to the present invention. Diversity related receivers 10, 12 are conventional per se, and provide respective audio outputs 14, 16, each covering an audio spectrum such as 300–3300 cycles per second.

In view of the sequencing rate employed in the diversity combining system of FIG. 1, the audio signals 14, 16 are each mixed in respective balanced mixers 18, 20 with respective IF carrier inputs 22, 24 (at 9.950 kcs., for example). Summation outputs 26, 28 are derived from the balance mixers 18, 20 and serve as the modulated IF inputs (with a frequency spectrum of 10.250 kcs.–13.250 kcs.) to respective channel segmentor and recombiner sections 30, 32. For ease of identification the signal channel including section 30 is also designated the A channel and the other signal channel, including section 32, is designated the B channel.

Figure 2:
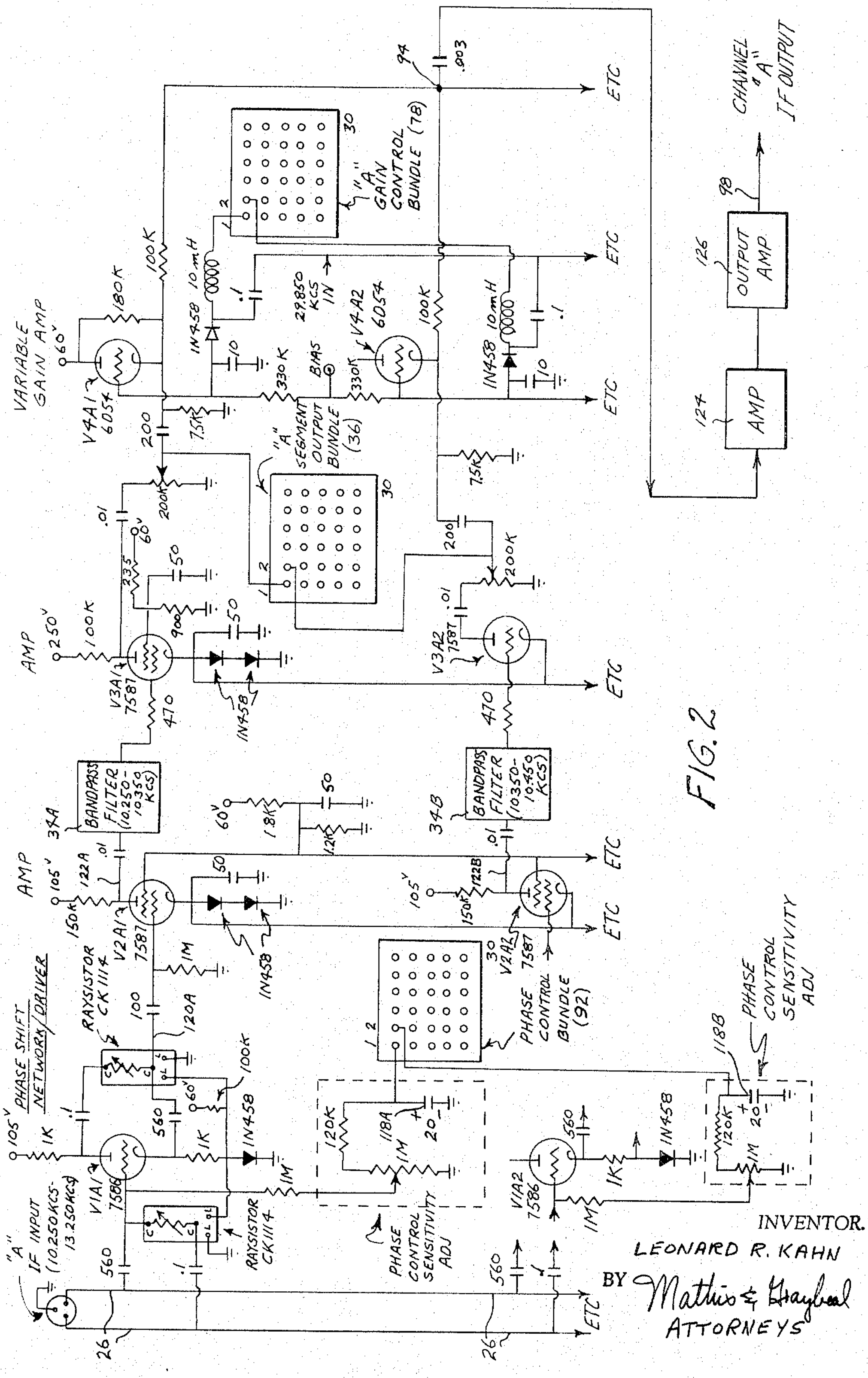
FIG. 2 is a somewhat simplified, principally schematic diagram of the A channel segmentor and recombiner section of the system shown in FIG. 1, with one sub-band signal path being shown and the stages of the second sub-band signal path thereof being shown fragmentarily.

Channel segmentor and recombiner section 30 (as shown in FIG. 2 and discussed in more detail below) functions to segment the IF channel into a multiplicity (thirty in the example selected) of channel sub-bands or segments, each 100 cycles wide, and collectively spanning the intermediate frequency passband. Such segmenting is effected by a parallel array of thirty bandpass filters, two of which are shown in FIG. 2 at 34A, 34B. These various bandpass filters, and the respective related amplification stages V3A1, V3A2, etc., and variable gain amplification stages V4A1, V4A2, etc. provide thirty discrete sub-band signal paths. As also shown in FIG. 2, from each such sub-band signal path is derived a signal segment output or sample, the various segment outputs being collectively termed a segment output bundle and designated at 36 in FIGS. 1 and 2. As shown in FIG. 1, the segment output bundle 36 is one of the inputs to the brain 38.

As shown in FIG. 3, the B channel segmentor and recombiner 32 includes a parallel array of thirty bandpass filters (two of which are shown in FIG. 3 at 40A, 40B) and associated sub-band signal paths, and derives from modulated IF input 28 a segment output bundle 42, which serves as the second input to the brain 38.

The central element of brain 38 is a multi-stage sequential switching device. In the form shown, such switching device is a synchronously driven commutator, generally designated at 44, comprised of five commutator rings 46, 48, 50, 52, 54, each having thirty commutator segments, each in turn connected to an associated bundle element, in a manner conventional per se. Said commutator rings 46–54 are mechanically ganged together, as indicated at 56, and rotatively driven as by synchronous motor means (not shown) at an appropriate r.p.m. (for example 600 r.p.m. in the system selected for illustration, where a sampling of each channel segment is required each one-tenth second).

Figure 4:
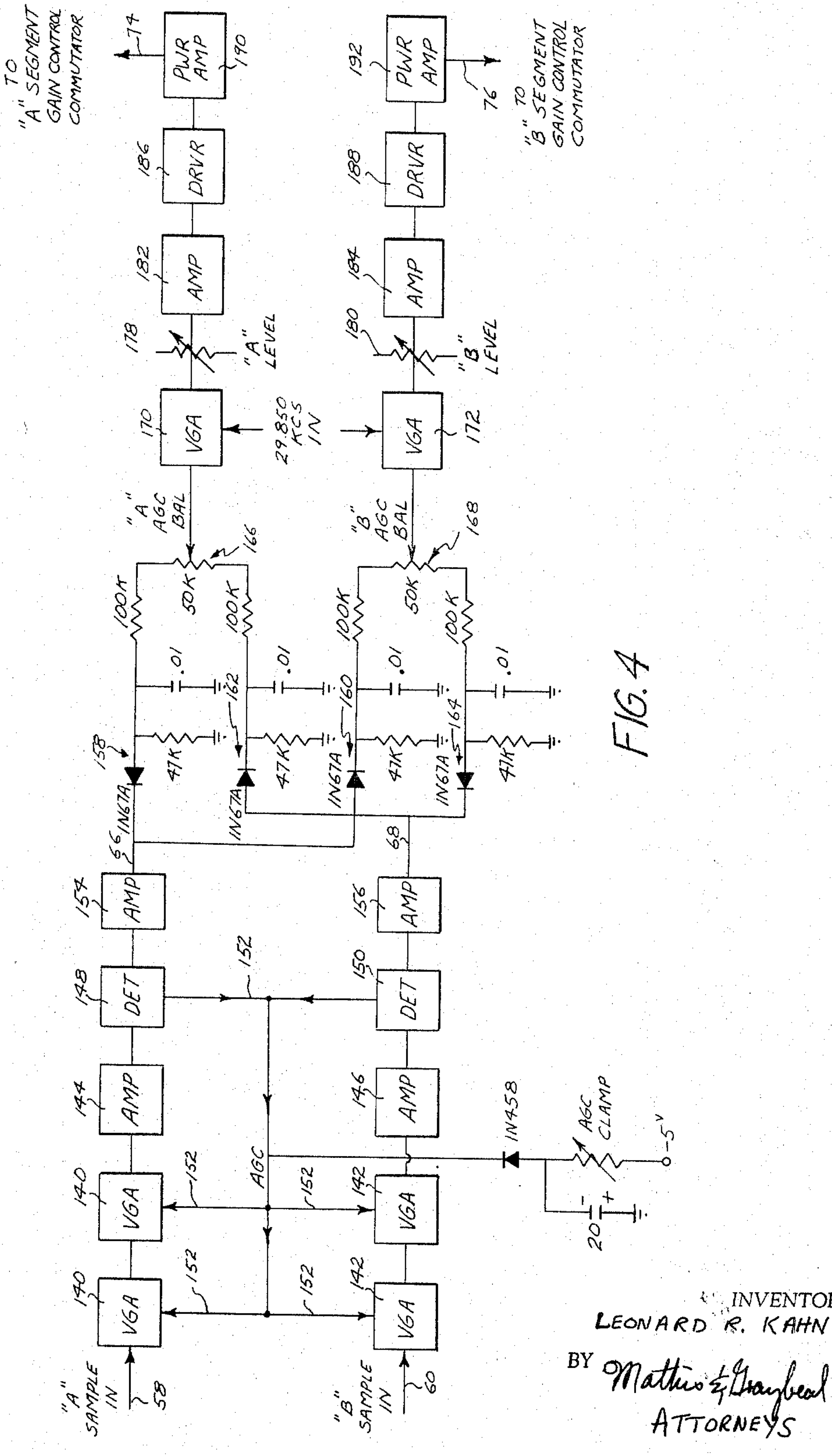
FIG. 4 is a block and schematic diagram of the amplitude comparator circuit, and A gain control circuit, and B gain control circuit of the "brain" portion of the system shown at FIG. 1, the schematic portion of said FIG. 4 being the specific detector stages developing the respective A segment and B segment gain control voltages.

In brain 38, the respective commutator rings 46, 48 sequentially scan the respective output bundles 36, 42 from channel segmentors 30, 32, and provide respective A sample and B sample inputs 58, 60, which are fed to both an amplitude comparator circuit generally indicated at 62 (and illustrated in more detail in FIG. 4) and a phase comparator circuit generally indicated at 64 (and illustrated in more detail in FIGS. 5 and 6). In general, the amplitude comparator circuit 62 develops respective sample outputs 66, 68 which are amplified to an extent determined by the stronger of the signal inputs. Respective gain control circuits 70, 72 develop from the signal inputs 66, 68 the respective gain control signals 74, 76 which, as shown in FIG. 1, are distributed by the respective commutator rings 50, 52 to the respective gain control bundles 78, 80, the gain control bundle 78 operating to appropriately vary the gain of associated amplifier stages, two of which are indicated at V4A1 and V4A2 in FIG. 2, and gain control bundle 80 similarly operating as an input to channel segmentor and recombiner section 32 to control the gain of the associated amplifier stages, two of which are shown at V4B1, V4B2, etc.

In order to maintain a substantially in-phase relationship between the signals in the respective sub-bands of like frequency in the channel segmentors and recombiners 30, 32, the phase comparator circuit 64 develops from respective signal inputs 58, 60 an output 82, the voltage level of which is a function of the phase difference between the signal inputs 58, 60. From this phase difference related signal 82, phase control circuit 84 develops an appropriate phase correction signal for the channel segmentor and recombiner section 30, such phase correction signal being indicated at 86. As will be noted, said phase correction signal 86 is the output signal from the phase comparator and phase control circuits shown at FIG. 5, and is one of the inputs to the auto-set circuit 88.

The purpose and manner of operation of the auto-set circuit 88 is discussed below in more detail in connection with a specific consideration of the FIG. 7 circuit. However, in general and for purposes of a preliminary consideration of the overall system as shown at FIG. 1, the auto-set circuit 88 can be viewed as normally providing an output 90 which is either the automatic phase control voltage output 86 from phase control circuit 84, or a static voltage functioning to return the control voltage appearing at the controlled circuit to the center of its operating range in the event the automatic control voltage exceeds the control range in the controlled circuit. As a further alternative, said auto-set output 90 can simply be a static phase centering voltage in the event a sub-band signal path of the channel segmentor and recombiner 30 is inactive (i.e. does not contain a signal of at least a predetermined signal strength).

The output 90 from auto-set circuit 88 is distributed by commutator ring 54 to phase control bundle 92, and functions to control the relative phase of the sub-band signal paths in the grid circuits of the respective driver stages of channel segmentor and recombiner 30, two of which are indicated in FIG. 2 as V1A1, V1A2.

With the various channel segment or sub-band signal paths in the segmentor and recombiner sections 30, 32 appropriately maintained as to relative gain and phase, the respective signal segments thereof are recombined as at circuit point 94 in FIG. 2 and circuit point 96 in FIG. 3, and after further amplification respectively provide a channel modulated IF output 98 from section 30 and a modulated IF output 100 from section 32. These channel outputs 98, 100 are then further combined, in a manner conventional per se, in channels combiner 102, the output 104 from which is mixed in balance mixer 106 with an IF carrier input 108 to produce a difference output 110 which, after passing through low pass filter 112, is a combined audio signal 114 having essentially the same frequency spectrum as the audio intelligence of the received signals 14, 16 (i.e. an audio signal with a frequency spectrum of 300–3300 cycles per second). This combined signal 114 is fed to an appropriate utilization means 116, conventional per se, such as a loudspeaker in the case where the audio signal is of the voice type, or a teletype in the case where the communications system is of the FSK type.

In FIGS. 2, 3, 4, 6 and 7, discussed in more detail below, the schematic portions of the circuits presented are self-contained, with type designations given therein as to circuit components such as tubes, diodes and the like, and with component values given in the usual manner where the component is shown to be simply a resistor, condenser, or inductor.

A simplified schematic showing of the A channel segmentor and recombiner section 30 is presented at FIG. 2. The modulated IF input 26 is fed to a parallel array of thirty phase shift/driver stages V1A1, V1A2, etc. In each such phase shift/driver stage, the phase of each channel segment passed through a subsequent associated bandpass filters 34A, 34B, etc. is adjusted so as to be substantially in phase with the corresponding segment in the B channel segmentor and recombiner 32, the phase of each latter segment being taken as the reference, and the phase control being accomplished by the control voltage input through phase control bundle 92, each element of which feeds an associated phase control sensitivity adjustment circuit in the grid circuit of each of the network/driver stages V1A1, V1A2, etc. The Raysistor element in the grid and plate circuits of each phase shift/driver stage V1A1, V1A2, etc. is a commercially available variable resistor element, which varies in resistance responsive to applied voltage.

The respective outputs (as at output 120A from network/driver stage V1A1) are fed to associated respective amplification stages V2A1, V2A2, etc., and the respective outputs 122A, 122B etc. thereof are fed to the parallel array of bandpass filters 34A, 34B, etc., each of which passes a different 100 cycle segment in the channel spectrum, i.e. bandpass filter 34A passes the frequency segment 10.250–10.350 kcs., bandpass filter 34B passes the segment 10.350–10.450 kcs., and so on, consecutively, the last bandpass filter in the array passing the frequency segment 13.150–13.250 kcs. The phase and amplitude characteristics of the respective bandpass filters 34A, 34B, etc. are carefully pre-adjusted so that the overall bandpass character of the channel is flat in both amplitude and phase, in a manner known per se.

The respective outputs of the bandpass filters 34A, 34B, etc. are passed to respective amplification stages V3A1, V3A2, etc., and the A segment output bundle 36 is derived from the various respective outputs of these amplification stages, as shown in FIG. 2. The amplified segments appearing in the outputs of the respective amplifiers V3A1, V3A2, etc. are also fed to respective variable gain amplification stages V4A1, V4A2, etc., the respective grid circuits of which are connected to respective inputs from the A gain control bundle 78, so that each channel segment appearing in an associated variable gain amplification stage V4A1, V4A2, etc. is controlled in amplitude so that the amplified segments appearing in the respective outputs of the variable gain stages V4A1, V4A2, etc., when combined together at circuit point 94, and further amplified in amplification stages 124, 126 and further combined in channels combiner 102 with the channel B output from the B channel segmentor and recombiner 32 provide an optimized signal-to-noise ratio, segment for segment.

The B channel segmentor and recombiner section 32 schematic shown in FIG. 3 is the same as the A channel segmentor and recombiner section 30 schematic shown in FIG. 2, except that the phase shift/driver stages are omitted, the B channel segments being used in the phase comparative circuit 64 as the phase reference. Thus, in FIG. 3, the modulated IF input 28 is fed to a parallel array of bandpass filters 40A, 40B, etc., having segment passbands which are respectively identical to the passbands of the bandpass filters 34A, 34B, etc. in FIG. 2. The respective filter outputs from filters 40A, 40B, etc. are fed to amplification stages V3B1, V3B2, etc. from which the B segment output bundle 42 is derived, together with respective inputs to variable gain amplification stages V4B1, V4B2, etc. wherein the B gain control bundle 80 inputs establish the appropriate gain in each stage V4B1, V4B2, etc. so that the recombined output appearing at circuit point 96, when further amplified in amplification stages 128, 130 and recombined in channels combiner 102 with the A section 30 output, is optimized in signal-to-noise ratio, segment for segment.

The brain 38 has two principal functions. The first of these is amplitude comparison and control, effected by amplitude comparator circuit 62 and respective A and B gain control circuits 70, 72. When combining diversity signals, it is highly desirable that the signals be combined according to the so-called "ratio squarer" principle, as discussed in my U.S. Patent No. 3,030,503. The specific amplitude comparator circuit 62 used in the embodiment of the invention illustrated is designed to operate according to the ratio squarer principle. Ratio squaring requires that the weaker of two signals being combined be amplified less than the stronger signal, by a factor equal to the difference in signal levels, i.e. if the input signals are originally 3 db apart in level, the gain correcting device should introduce an additional 3 db loss in the weaker channel so that at the output the ratio would be squared, i.e. be 60 db apart. To this end, the amplitude comparator circuit and responsive gain control circuits, as shown diagrammatically and schematically in FIG. 4, operate as follows. Respective A and B sample inputs 58, 60 from the respective commutator rings 46, 48 are separately fed to respective variable gain amplification stages 140, 142 and respective amplification stages 144, 146. The gain of the variable gain amplification stages 140, 142 is determined by the stronger of the two signals. This is accomplished by taking the outputs of the amplification stages 144, 146 and detecting them in respective diode detector stages 148, 150, having a common load. This type of detector circuit is known per se and operates so that the stronger signal in one diode detector back biases the other diode detector, cutting it off, so only the stronger signal controls the AGC inputs 152 to the variable gain amplification stages 140, 142. This AGC action thus maintains a constant output for the stronger signal 66, or 68, as the case may be. After appropriate further amplification of the respective outputs from detectors 148, 150 in amplifiers 154, 156, the weaker signal output 66 or 68 from the amplitude comparator circuit is maintained at whatever difference in amplitude exists between the input signals 58, 60, with the stronger signal output 66 or 68 being always maintained at a set voltage level.

The outputs 66, 68 from the amplifiers 154, 156 are fed to respective diode detector stages 158, 160, and 162, 164, and respective summation potentiometers 166, 168 are provided across the respective detector stages 158, 162 and 160, 164. The operation of this detection arrangement provides that a relatively positive voltage is produced at the output tap of a respective one of the potentiometers 166, 168, as compared with the voltage at the other, depending on which of the signal inputs 66, 68 is relatively weaker than the other. Manual adjustment of the tap points of the potentiometers 166, 168 in each case provides a channel AGC balance adjustment, thus designated in FIG. 4. The respective AGC control voltages appearing at the taps of potentiometers 166, 168 are fed to respective variable gain amplifiers 170, 172, and said control voltages are mixed with a suitable IF carrier (29.850 kcs. being shown at FIG. 4), which carrier frequency serves simply to transform the control voltages to more readily usable frequencies, in view of the switching rate in distribution of the various segment control voltages through the respective commutator rings 50, 52. When a given AGC control voltage output from the potentiometers 166, 168 is relatively positive, with respect to the other, the gain of the associated variable gain amplification stage 170, 172 is thereby controlled to produce a relatively low level respective IF output 174, 176. These respective control signals, after passing through respective manual level adjustments 178, 180, amplification stages 182, 184, driver stages 186, 188, and power amplification stages 190, 192, constitute the respective AGC control outputs 74, 76 from the gain control circuits 70, 72 (FIG. 1), which are in turn distributed by commutator rings 50, 52 to the respective gain control bundles 78, 80, controlling the variable gain amplification stages V4A1, V4A2, etc. on the one hand, and variable gain amplification stages V4B1, V4B2, etc., on the other hand. These various variable gain amplifiers are thus controlled so that the gain of any stage passing a relatively weaker channel segment is reduced by a factor equal to the difference in signal strength between the corresponding channel segments, i.e. the desired ratio squarer amplitude correction is achieved, segment for segment.

The second basic function of brain 38 is the comparison of phase of the corresponding A and B segments and the generation of corresponding phase control voltages to maintain the respective corresponding segments substantially in phase. This function is performed by phase comparator circuit 64, phase control circuit 84, and auto-set circuit 88. One branch of the phase comparator circuit 64 and phase control signal generating circuit 84 are shown in block diagram form in FIG. 5, and certain portions thereof are shown schematically in FIG. 6.

Respective A sample and B sample inputs 58, 60 are fed to limiter stages 200, 202 and in turn through respective phase splitters 204, 206, drivers 208, 210, and power amplifiers 212, 214. A limited portion 216 of the A sample input, derived at the output of limiter 200, is passed through the auto-set circuit (FIG. 7) to provide an indication of signal level for one of the control functions of the auto-set circuit.

The A sample output 218 from power amplifier 212 is fed to a parallel array of twelve fixed phase shift networks 220A, 220B, 220C, 220D . . . 220L. The respective phase shifts of these networks 220A–220L cover, in the frequency range of from 10.250 kcs. to 13.250 kcs., a full cycle (i.e. substantially 360°), in approximately 30° steps, and have accordingly been respectively designated "0° phase shift," "30° phase shift,"—"330° phase shift." The specific circuit detail in these respective phase shift networks is discussed below in connection with FIG. 6.

The respective outputs of the twelve phase shift networks 220A–220L are fed to twelve respectively associated summation circuits 222A–222L, each of which also receives the output 224 from the B channel power amplifier 214, as the reference phase. The respective summation circuits 222A–222L add the phase shift network outputs and the channel B output 224, and the respective summation outputs 226A–226L are fed to respective individual diode detectors 228A–228L. In the summation circuits 222A–228L, whichever of the phase shift circuits 220A–220L changes the phase of the channel A sample closest to out-of-phase relationship with the channel B reference sample will produce the smallest negative voltage in its associated output (say 226D in the case where the phase shift between the channel output 218 and 224 is 90° and the 90° phase shift network 220D adds an additional 90° phase difference). This smallest negative voltage output (i.e. output 226D in the assumed example) produces a minimum bias and consequently maximum gain in its associated variable gain amplifier 230A–230L (i.e. variable gain amplifier 230D for the assumed phase difference). In general, that variable gain amplifier 230A–230L which is driven by the signal having component of opposite phase (i.e. 180° phase difference) has less negative bias and therefore more gain than any of the other variable gain amplifiers.

A 100 kcs. carrier input 232, serving simply as a convenient IF carrier for the phase control signal, is fed to each of the variable gain amplifiers 230A–230L so that whichever variable gain amplifier is controlled to have the greatest gain produces the strongest 100 kcs. output wave. This strongest 100 kc. wave is in turn fed to the associated one of diode detectors 236A–236L, the cathodes of which are connected together as indicated at 238 (FIG. 6) across a common load (resistor 240, FIG. 7). Whichever respective diode of detectors 236A–236L receives the strongest 100 kc. sample 234A–234L will conduct and bias all of the other diode detectors 236A–236L to cutoff. The conducting diode detector 236A–236L produces at the plate side of the diode a negative DC voltage which can be measured and can accordingly provide an indication as to which of the diodes is conducting. In order to provide this indication, the DC voltage on the plate side of each diode is applied to an associated resistor 242A–242L, collectively designated $R_x$ in FIG. 6. As shown in the tabular portion of FIG. 6, each of the resistors 242A–242L has a different resistance value, so that the amount of DC voltage which reaches the junction (output 82) of these twelve resistors 242A–242L is a function of whichever of the diode detectors 236A–236L is conducting. In this manner, the output 82 is responsive to and provides an indication of the relative phase relationship between the A and B sample inputs 58, 60 over a phase difference range substantially a full 360°.

The change in DC voltage at output 82 over the range of phase difference indicated is relatively small; therefore, it is necessary to amplify this DC voltage before use thereof for automatic phase control in the A channel segmentor and recombiner section 30. To this end, the DC output 82 is fed to an additional variable gain amplifier 244, which also receives a 19.900 kcs. carrier input 246. The amount of 19.900 kcs. signal appearing at the output 248 from the variable gain amplifier 244 is determined by the phase relationship between the two input waves to the phase comparator circuit. This 19.900 kcs. wave is in turn passed through a further amplification stage 250, phase splitter 252, driver 254, push-pull power amplifier 256 and detector stage 258, with the resulting amplified DC signal, to which is applied a manually variable phase correction bias (variable resistor 260), being then utilized as the automatic phase control output 86 to the auto-set circuit 88.

FIG. 6 serves to illustrate schematically a portion of one of the branches of the phase shift, summation, peak detector, variable gain amplifier, and phase detector circuit stages of the circuitry shown at FIG. 5. In said FIG. 6, the A channel input is indicated at 218 and the B channel reference input is indicated at 224, while the phase shift network is indicated at 220 (representing a typical one of the respective phase shift networks 220A–220L). The extent of phase shift in said network 220 is determined by the value of condenser $C_x$ thereof, and specific $C_x$ values for respective phase shift networks are shown in the tabular portion of FIG. 6. The summation circuit is generally designated in FIG. 6 at 222, and the peak detector circuit is designated at 228. The variable gain amplifier of the phase comparator circuit branch shown at FIG. 6 is designated at 230 and the 100 kcs. carrier input 232 is also designated in its grid circuit. The phase detector stage is generally designated in FIG. 6 at 236 (including common load resistor 240, as earlier indicated), and the DC output level determining resistance of this circuit is indicated at $R_x$, with the various $R_x$ values for the respective phase shift stages being indicated in the tabular portion of FIG. 6.

The auto-set circuit illustrated in FIG. 7 functions as an active channel control, an automatic high reset, and an automatic low reset, for the automatic phase control voltage output 86 from the phase control circuit. The portions of the auto-set circuit performing each of these functions will be described in order.

As to the active channel control, it is to be first observed that control of phase of a given channel segment is desirable only when that channel segment is active, i.e. contains signal intelligence. Basically, the function of the active channel control is that of sensing which channel segments are active, and connecting the automatic phase control voltage to those branches of the segmentor and recombiner section 30 while the segments are active, and delivering a stored, recentering phase control voltage to the controlled circuit during periods when the channel segment is not active. The self-centering feature of the auto-set circuit is of particular importance when the equipment is used to process voice of FSK intelligence, or when fading of the signal occurs. The activity of a particular channel segment is sensed by delivering to the auto-set circuit an input 216 from limiter stage 200 of the phase comparator circuit. When a given channel segment is active, the signal level at auto-set circuit input 216 is in the nature of a pulse over the period during which that sample is scanned. The presence of such pulse is detected in peak detector 270 and the pulse, after passing through low pass filter 272 functions to turn on DC amplifier 274, which in turn energizes relay control 276, closing relay contact 278 (shown in its energized position). In such energized position of relay contact 278, the automatic phase control output 86 is passed to the auto-set output 90 and thence to phase control commutator ring 54, assuming the low reset and high reset relay contacts, discussed below, are also in circuit as shown in FIG. 7. In the absence of a sufficient pulse in the input 216 to turn on DC amplifier 274, the relay control 276 is deenergized, and relay contact 278 is moved to its reverse position, whereupon the associated one of the phase storage capacitors 118A, 118B, etc. in the associated phase shift/driver stages V1A1, V1A2, etc. of section 30 is allowed to trickle charge through resistors 280, 282 to a value which centers the phase of that channel segment, a variable phase centering bias adjustment being provided at resistor 280 for pre-setting, i.e. zero phasing, of the phase shift/driver stage.

As to the high and low reset functions of the auto-set circuit, it is to be first considered that the phase shift/driver stages have a finite phase control range, so that a continuous increase or decrease in phase difference may generate a phase control voltage exceeding the effective range of the phase shifter stages. Such a condition, although rare, is not impossible, and would result in automatic phase control failure unless the automatic phase control voltage is "reset" at the extremes of its design operating range. The accomplishment of such resetting is the purpose of what are termed the high reset and low reset portions of the auto-set circuit.

As shown in FIG. 7, the high reset portion of the auto-set circuit includes a DC amplifier 284 receiving an input 286 which is a sample of the phase control output 90. As shown in FIG. 1, this output 90 is connected through commutator ring 54 to phase control bundle 92, the elements of which are respectively connected to associated phase control voltage storage capacitors 118A, 118B, etc. (FIG. 2) in the respective phase shift/driver stages V1A1, V1A2, etc. In this circuit arrangement, the input 286 to DC amplifier 284 in the auto-set circuit in effect measures the DC value of each of the control voltage storage capacitors 118A 118B, etc. as the commutator 44 revolves. At an adjustable, preset DC value, i.e., when the voltage level on any of the storage capacitors 118A, 118B, etc. is greater than a predetermined value, the DC amplifier 284 becomes nonconductive and de-energizes "normally on" relay control 288, switching same from its energized position shown to its de-energized position, whereby the phase control output line 90 is disconnected from the phase control input 86 and connected to a static voltage determined by the manual setting of high reset level adjust potentiometer 290. This preset voltage is established at a level which is substantially in the center of the voltage range over which the voltage on the associated storage capacitor 118A, 118B, etc. is effective to control the phase shift of the channel segment passing through that stage V1A1, V1A2, etc. The high reset thus recenters the phase control voltage in the phase shift stage whenever the value thereof exceeds its operating maximum value.

The low reset portion of the auto-set circuit shown at FIG. 7 operates in a similar manner to the high reset portion thereof except that its DC amplifier 292 is designed to become conductive whenever the phase control voltage appearing at any given storage capacitor 118A, 118B, etc has a control voltage thereon which is less than a predetermined value. In such event, conduction of DC amplifier 292 energizes "normally off" relay control 294, which in turn switches relay contact 296 from the de-energized position shown to the energized position thereof where a static voltage determined by the setting of potentiometer 298 is delivered through phase control output 92 to that particular storage capacitor, returning the voltage level thereof to a value substantially in the center of its normal operating range. As will be apparent, and assuming there is sufficient signal present so that active channel relay control 76 is energized, the resetting or recentering of the voltage level in any given storage capacitor 118A, 118B during one commutation cycle results in the automatic phase control input 86 being delivered to and effective in that phase shift stage during the next and at least several succeeding commutation cycles, since a substantial time delay is required for the charge on the capacitor to again change sufficiently to require any further resetting.

From the foregoing, other variations, circuit and component arrangements, and adaptations of the invention will be apparent and readily determinable by those skilled in the art to which the invention is addressed. Thus, simply by way of further example, the invention can be utilized with other diversity combining systems of various types, involving three or more diversity channels, and/or involving post-detection combining rather than pre-detection combining. It will be further apparent that in the case of a post-detection type combining system the phase comparison and automatic phase control portions of the system can be dispensed with. As will also be evident, diversity systems according to the invention can readily involve other audio signal spectra and other intermediate frequency values than presented here by way of specific example, as well as other scanning rates in the sequential switching mechanism, a scanning rate of 1000 cycles per second or more being readily obtainable by transistorizing the switching means, for example. Evident as well is the fact that almost full-cycle or almost 360° phase comparator is a phase detector circuit of general application and can be used in any circuit environment where it is desired to produce an output related to the extent of phase difference between two input signals over a full cycle. Similarly, also, it will be apparent that the auto-select circuit portion of the system here disclosed has independent utility, such as for the automatic resetting of an automatic gain control or other automatic correction type circuit wherein the circuit controlled has a finite operating range related to control voltage level. Other applications of the auto-select circuit, with regard to selective transmission of an automatic correction signal depending upon presence or absence of signal in a communications signal path will also be apparent.

What is claimed is:

1. In a diversity receiver system of the type wherein a plurality of diversely received and separately channeled signals are combined to give a combined signal incorporating the audio intelligence of both signals, the method of optimizing the signal-to-noise ratio of the combined signal, comprising:

(a) establishing the audio signal intelligence of the diversely received signals in separate signal passbands;

(b) segmenting each of such signal passbands into a multiplicity of separate sub-bands providing sub-band signal paths which in each instance collectively span the passband;

(c) comparing in rapid sequence the amplitude of the signal segment in one sub-band signal path with the amplitude of the signal segment in a sub-band signal path of like frequency in another such passband;

(d) controlling in rapid sequence the relative gain of the various sub-band signal paths in a manner maintaining the gain of each sub-band signal path relative to the gain of the other sub-band signal path of like frequency so that the output signal-to-noise ratio is substantially improved;

(e) combining the segment sub-band and passband outputs;

(f) deriving from the combined passband outputs an audio signal having essentially the same frequency spectrum as the audio intelligence of the received signals; and (g) applying the combined audio signal to a utilization means.

2. In a diversity receiver system of the type wherein a plurality of diversely received and separately channeled signals are combined to give a combined signal incorporating the audio intelligence of both signals, the method of optimizing the signal-to-noise ratio of the combined signal, comprising:

(a) establishing the audio signal intelligence of the diversely received signals in separate intermediate frequency passbands;
(b) segmenting each of such intermediate frequency passbands into a multiplicity of separate sub-bands providing sub-band signal paths which in each instance collectively spans the intermediate frequency passband;
(c) comparing in rapid sequence the amplitude and phase of the signal segment in one sub-band signal path with the amplitude and phase of the signal segment in a sub-band signal path of like frequency in the other such intermediate frequency passband;
(d) controlling in rapid sequence the relative gain and relative phase shift of the various sub-band signal paths in a manner maintaining the gain of each sub-band signal path relative to the gain of the other sub-band signal path of like frequency so that the output signal-to-noise ratio of the stronger signal segment is essentially the square of the output signal-to-noise ratio of the weaker signal segment and so that the outputs of the respective sub-band signal paths are essentially in phase;
(e) combining the outputs of the respective sub-band signal paths in each intermediate frequency passband;
(f) combining the intermediate frequency passband outputs;
(g) deriving from the combined passband outputs an audio signal having essentially the same frequency spectrum as the audio intelligence of the received signals; and
(h) applying the combined audio signal to a utilization means.

3. In a system for combining diversity receiver outputs to provide a combined output having an improved signal-to-noise ratio;

(a) means separating the respective receiver outputs into frequency related segments;
(b) means sequentially comparing the relative amplitudes of the resulting respective signal segments of like frequency;
(c) means maintaining the relative amplitudes of the compared segments in proper proportion to improve the signal-to-noise ratio thereof when recombined; and
(d) means combining the signal segments to provide said combined output.

4. In a system for combining diversity receiver audio outputs to provide a combined output having an improved signal-to-noise ratio;

(a) means modulating separately intermediate frequency carrier waves with the respective receiver outputs;
(b) means separating the respective modulated intermediate frequency waves into frequency related segments;
(c) means sequentially comparing the amplitudes of the resulting respective signal segments of like frequency;
(d) means maintaining the relative amplitudes of the compared segments in proper proportion to improve the signal-to-noise ratio thereof when recombined;
(e) means recombining the signal segments; and
(f) means combining the recombined segments to provide said combined output.

5. In a system for combining diversity receiver outputs to provide a combined output having an improved signal-to-noise ratio;

(a) separate segmentor means into which the receiver outputs are channeled;
(b) means sequentially comparing the resulting respective signal segments of like frequency as to relative amplitude and relative phase;
(c) means maintaining the relative amplitudes of the compared segments in proper proportion to improve the signal-to-noise ratio thereof when recombined;
(d) means maintaining the compared segments substantially in phase;
(e) means recombining the channel segments; and
(f) means combining the channel outputs to provide said combined output.

6. In a system for combining diversity receiver outputs to provide a combined output having an improved signal-to-noise ratio;

(a) separate means segmenting each receiver output;
(b) a single brain section, common to all signal segment signal paths, including;
  (1) a repetitive switching means sequentially sampling respective pairs of signal segments of like frequency;
  (2) means successively comparing said signal segments;
  (3) means successively generating gain control voltages to establish the amplitude of the successive pairs of signal segments at relative values improving the signal-to-noise ratio of the pairs of signal segments when combined; and
  (4) a repetitive switching means sequentially connecting said gain control voltages to gain control stages in each respective segmenting means; and
(c) means combining said signal segments to provide said combined output.

7. In a system for combining diversity receiver outputs to provide a combined output having an improved signal-to-noise ratio;

(a) separate segmenting means for each receiver output;
(b) a single brain section, common to all signal segment signal paths, including;
  (1) a repetitive switching means sequentially sampling respective pairs of signal segments of like frequency;
  (2) means successively comparing said signal segments;
  (3) means successively generating gain control voltages to establish the amplitude of the successive pairs of signal segments at relative values improving the signal-to-noise ratio of the pairs of signal segments when combined;
  (4) a repetitive switching means sequentially connecting said gain control voltages to gain control stages in each respective segmenting means;
  (5) means successively comparing said pairs of signal segments as to relative phase and generating from such comparison successive automatic phase control voltages; and
  (6) a repetitive switching means sequentially connecting said automatic phase control voltages to segment phase control stages of each said segmenting means; and
(c) means combining said signal segments to provide said combined output.

8. A system according to claim 7, further comprising an automatic resetting circuit, operating in conjunction with the automatic phase control voltage generating means to substitute for the phase control voltages fed to the said segment phase control stages a DC voltage at a level to establish and maintain each respective phase control stage substantially centered in its operating range whenever the said automatic phase control voltage falls outside of said range.

9. A system according to claim 8, further comprising means substitutively delivering a centering DC voltage to said segment phase control stages, in lieu of said automatic phase control voltage, whenever the signal level in phase control stage is below a predetermined level.

10. A diversity receiver system, comprising: separate receiver means for receiving radio frequency energy modulated with audio intelligence and deriving therefrom separate, diversity related audio signals; separate means modulating an intermediate frequency carrier with said respective audio signals; a first channel segmentor and recombiner for one such modulated intermediate frequency signal, wherein said modulated intermediate frequency signal is segmented into a multiplicity of separate sub-bands; a second channel segmentor and recombiner means wherein the second modulated intermediate frequency signal is segmented into a multiplicity of separate sub-bands providing sub-band signal paths; commutator means sampling in rapid sequence signals from each sub-band in said first segmentor and recombiner means and said second channel segmentor and recombiner means; an amplitude comparator circuit comparing the relative signal strength of the signals appearing in respective sub-bands of like frequency; gain control circuit means generating respective gain control voltages from the outputs of said amplitude comparator circuit; commutator means connecting each said gain control circuit to its respective channel segmentor to maintain the outputs thereof when recombined at a substantially optimum signal-to-noise ratio; means combining the outputs of the respective sub-band signal paths and deriving from the combined output an audio signal having essentially the same frequency spectrum as the audio intelligence of the received signals.

11. A diversity receiver system, comprising: separate receiver means for receiving radio frequency energy modulated with audio intelligence and deriving therefrom separate, diversity related A and B audio signals; separate means modulating intermediate frequency carriers with said respective audio signals; an A channel segmenting means; wherein said modulated intermediate frequency signal is segmented into a multiplicity of separate, frequency related sub-bands; a second channel segmentor and recombiner means wherein the second modulated intermediate frequency signal is segmented into a multiplicity of separate, frequency related sub-bands; switching means successively sampling in rapid sequence the signals from each sub-band in said first channel segmentor and said second channel segmentor; an amplitude comparator circuit comparing the relative signal strength of the signals appearing in respective sub-bands of like frequency; gain control circuit means generating respective gain control voltages from the outputs of said amplitude comparator circuit; commutator means connecting each said gain control circuit to its respective channel segmentor to maintain the relative gain in said channel segmentor means in proportion to maintain the outputs thereof when recombined at a substantially optimum signal-to-noise ratio; a phase comparator circuit deriving from respective segment samples from the respective channel segmentor means an indication of the relative phase relation between said signal segments; automatic phase control circuit means developing a phase control signal related in voltage level to the relative phase difference between the respective signal segments; automatic reset circuit means by which the phase control means is reset to within an operating voltage range should the phase correction voltage exceed a predetermined maximum or be less than a predetermined minimum; circuit means sensing the presence of a signal of at least a predetermined level in one input to said automatic phase control circuit and functioning to decouple the output of said automatic phase control circuit whenever the signal level of said input thereto is less than a predetermined level; commutator means sequentially connecting said automatic phase control circuit output to whichever sub-band signal path of one of said channel segmentor means is in circuit so that the respective signal segments of like frequency in said channel segmentor means are maintained essentially in phase; means combining the outputs of the respective sub-band signal paths in each said channel segmentor; means combining the outputs of the respective recombined segments; means deriving from such combined outputs an audio signal having essentially the same frequency spectrum as the audio intelligence of the received signals; an audio signal utilization means; and means applying such combined audio signal to said utilization means.

12. A phase detector circuit for determining the phase difference between two signal inputs over substantially a full cycle of phase difference, comprising:

(a) means producing two signal inputs, the phase difference between which is to be detected;

(b) means separately applying the first of said signal inputs to all of a parallel array of fixed phase shift means, each of which shifts the phase of the input signal a substantially different amount;

(c) means comparing a portion of the second of said signal inputs with the output of each said phase shift means and deriving from such comparison an indication as to which of the said phase shift means has produced an output in phase opposition to the said second signal input and thereby provide an indication of the extent of phase difference between the first mentioned signal inputs.

13. In combination with a phase detector circuit of claim 12, a controlled circuit wherein one of the said first mentioned signal inputs is generated; and means deriving from the phase shift means producing opposed signal portions a phase control voltage; and means applying the said phase control voltage to an automatic phase control stage in said controlled circuit so as to normally maintain the said first mentioned signal inputs substantially in phase.

14. A phase detector circuit for detecting the phase difference between two signal inputs over substantially a full cycle of phase difference, comprising:

(a) means producing two signal inputs, the phase difference between which is to be detected;

(b) means separately applying the first of said signal inputs to a parallel array of fixed phase shift networks, each of which shifts the phase of a portion of the said first input signal a relatively different amount substantially over a full cycle of phase shift;

(c) a parallel array of summation stages, each receiving a portion of the second of said signal inputs, as a phase reference, and each also receiving an input from an associated one of said fixed phase shift networks;

(d) a parallel array of peak detection means, each receiving an output from an associated one of said summation means;

(e) a parallel array of variable gain amplification means, each controlled in gain by an input from an associated one of said peak detection means so that the said variable gain amplification means associated with the conductive peak detection means having the least output level has the highest relative gain;

(f) means providing a carrier input to each of said variable gain amplification means;

(g) a parallel array of detection means, each detecting the output of an associated one of said variable gain amplification means, said latter detection means having a common load connected so that only the peak detection means receiving the strongest signal input from its associated variable gain amplification means is conductive and biases the other said detection means to cutoff; and (h) an array of load means, each of a different impedance, and each connected in the return path of an associated one of said latter detection means, whereby the current flow through the load of the conductive detection means provides a distinctive indication of which detection means is conductive and consequently a determination of the phase difference between the first mentioned signal inputs.

15. In combination with a phase detector circuit according to claim 14, a controlled circuit in the signal path of one of the said first mentioned signal inputs; and means amplifying the output voltage from the said conductive detector means and applying the amplified voltage as an automatic phase control voltage in said controlled circuit so as to normally maintain the said first mentioned signal inputs substantially in phase.

16. The phase detector circuit of claim 14, wherein said fixed phase shift networks collectively span a full cycle of phase delay, in increments of about 30°.

17. In combination;

(a) a controlled circuit providing a signal path for a signal containing audio intelligence, one characteristic of which is to be maintained in predetermined relationship with reference to the same characteristic of another signal in response to a correction voltage operable to effect such correction over a finite range of voltage values;

(b) an automatic correction voltage generating circuit responsive to a comparison of the characteristics of the said signals and normally providing an output serving as said correction voltage;

(c) means sensing the signal level in said controlled circuit; and (d) means responsive to the sensed signal level operating to connect said correction voltage to said controlled circuit when said signal level is above a predetermined level, and to interrupt the connection of said correction voltage to said controlled circuit whenever said signal level is less than said predetermined level.

18. The combination of claim 17, further comprising a DC source of voltage at a level within said finite range of voltage values; and means substitutively connecting said DC voltage to said controlled circuit in lieu of said correction voltage whenever said signal level is less than the said predetermined value.

19. In combination;

(a) a controlled circuit providing a signal path for a signal containing audio intelligence, one characteristic of which signal is to be maintained in predetermined relationship with reference to the same characteristic of another signal in response to a correction voltage operable to effect such correction over a finite range of voltage values;

(b) an automatic correction voltage generating circuit responsive to a comparison of the characteristics of the said signals and normally providing an output serving as said correction voltage; and (c) means sensing the voltage level of said correction voltage and interrupting the connection thereof to said controlled circuit whenever the level of said correction voltage is outside of said finite range.

20. The combination of claim 19, further comprising a source of DC voltage at a voltage level substantially within said finite range of voltage values; and means substitutively connecting said DC voltage to said controlled circuit in lieu of said correction voltage at such time as the said means sensing the voltage level of said correction voltage interrupts the connection thereof to said controlled circuit.

21. The combination claimed in claim 19, further comprising means sensing the signal level in said controlled circuit; and means responsive to the level of said signal to connect said correction voltage to said controlled circuit when said signal level is above a predetermined level, and to interrupt the connection of said correction voltage to said controlled circuit whenever said signal level is less than said predetermined level.

22. The combination of claim 21, further comprising a DC source of voltage at a level within said finite range of voltage values; and means substitutively connecting said D.C. voltage to said controlled circuit in lieu of said correction voltage whenever said signal level is less than the said predetermined value.

No references cited.

KATHLEEN H. CLAFFY, *Primary Examiner.*

R. S. BELL, *Assistant Examiner.*